US011289717B2

(12) United States Patent
Bellosta Von Colbe et al.

(10) Patent No.: US 11,289,717 B2
(45) Date of Patent: Mar. 29, 2022

(54) SYSTEM AND METHOD FOR HEAT MANAGEMENT OF HIGH-TEMPERATURE SYSTEMS

(71) Applicant: Helmholtz-Zentrum Geesthacht Zentrum für Material-und Küstenforschung GmbH, Geesthacht (DE)

(72) Inventors: José M. Bellosta Von Colbe, Wentorf (DE); Thomas Klassen, Wentorf (DE); Martin Dornheim, Reppenstedt (DE); Klaus Taube, Hamburg (DE)

(73) Assignee: Helmholtz-Zentrum hereon GmbH

( * ) Notice: Subject to any disclaimer, the term of this patent is extended or adjusted under 35 U.S.C. 154(b) by 72 days.

(21) Appl. No.: 16/935,780

(22) Filed: Jul. 22, 2020

(65) Prior Publication Data

US 2021/0036343 A1    Feb. 4, 2021

(30) Foreign Application Priority Data

Aug. 2, 2019    (EP) ..................... 19189816

(51) Int. Cl.
*H01M 8/04007* (2016.01)
*H01M 8/04029* (2016.01)

(52) U.S. Cl.
CPC ... *H01M 8/04074* (2013.01); *H01M 8/04029* (2013.01)

(58) Field of Classification Search
CPC ......... H01M 8/04074; H01M 8/04029; H01M 8/04014; H01M 8/04201; H01M 8/04216
See application file for complete search history.

(56) References Cited

U.S. PATENT DOCUMENTS

2001/0026882 A1    10/2001   Thierfelder et al.
2020/0381757 A1*   12/2020   Jia ..................... B01D 53/8631

FOREIGN PATENT DOCUMENTS

| DE | 19836352 A1    | 2/2000 |
| DE | 102015006944 B3 | 9/2016 |
| JP | 7-186711 A     | 7/1995 |

OTHER PUBLICATIONS

European communication dated Feb. 12, 2020 in corresponding European patent application No. 19189816.2.
Sheshpoli et al., "Thermodynamic Analysis of Waste Heat Recovery from Hybrid System of Proton Exchange Membrane Fuel Cell and Vapor Compression Refrigeration Cycle by Recuperative Organic Rankine Cycle", Journal of Thermal Analysis and Calorimetry, vol. 135, pp. 1699-1712, 2019.

* cited by examiner

*Primary Examiner* — Stewart A Fraser
(74) *Attorney, Agent, or Firm* — Nields, Lemack & Frame, LLC

(57) ABSTRACT

The present invention relates to a system and method for the efficient heat management of a low-temperature fuel cell which is supplied from a metal hydride store. The system of the invention makes it possible to achieve, for example, discharge temperatures of the metal hydride store of about 180° C. in the case of low-temperature fuel cells operated at about 85° C.

19 Claims, 3 Drawing Sheets

SYSTEM AND METHOD FOR HEAT MANAGEMENT OF HIGH-TEMPERATURE SYSTEMS

FIELD OF THE INVENTION

Figure 1:
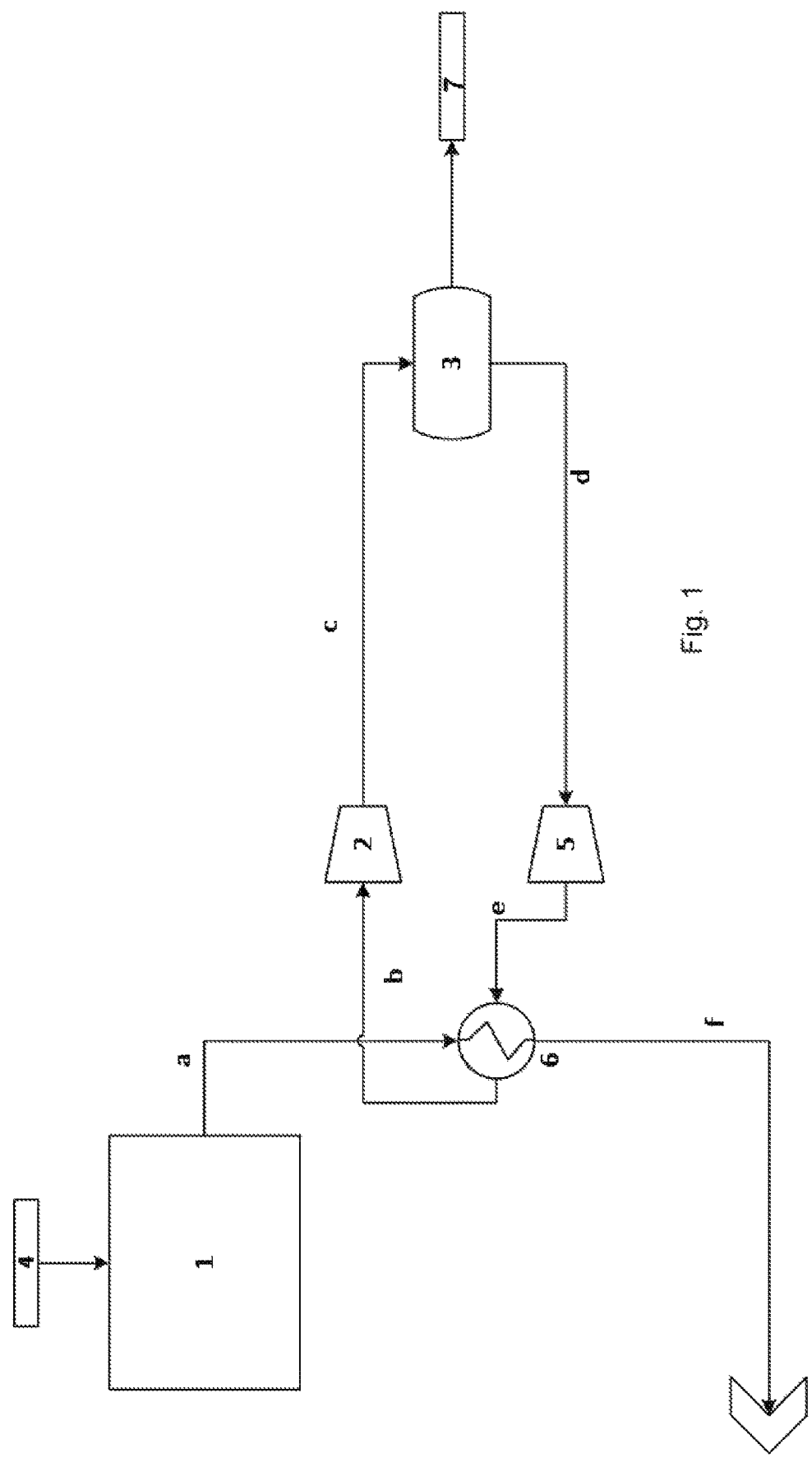

The present invention relates to a method for heat management of high-temperature systems. In particular, the present invention relates to the heat management of metal hydride stores, for example to improve the efficiency of low-temperature fuel cells operated using hydrogen from a metal hydride store in generation of electric power.

BACKGROUND OF THE INVENTION

In the electrolysis of water, the water molecules are split into hydrogen ($H_2$) and oxygen ($O_2$) by electric current. In a fuel cell, this process proceeds in the reverse direction. The electrochemical combination of hydrogen ($H_2$) and oxygen ($O_2$) to form water produces electric power with high efficiency.

The industrial implementation of the principle of the fuel cell has led to various solutions, specifically using different electrolytes and at operating temperatures in the range from 10° C. to 1000° C. The fuel cells are divided into low-temperature, medium-temperature and high-temp temperature fuel cells as a function of their operating temperature (see, for example, DE 198 36 352 A1). Low-temperature fuel cells operate at comparatively moderate temperatures of from 60° C. to 120° C. and are therefore particularly suitable for mobile applications such as operation of a motor vehicle. Cooling of low-temperature fuel cells can be carried out using water, a water/glycol mixture or a similar liquid.

In motor vehicles, the fuel cell of the PEM type is preferably used at present and is operated at temperatures in the range from 60° C. to 90° C.

The hydrogen required as fuel is usually provided from a pressure tank since here the hydrogen can be made available at ambient temperature. These pressure tanks have a comparatively large volume, so that the range in mobile applications such as operation of a motor vehicle is restricted by the limited storage space available. It is known that hydrogen stores based on metal hydrides, known as metal hydride stores, which have a very much smaller space requirement than pressure tanks can be constructed. Heat is liberated in the absorption of hydrogen in the metal and heat has to be supplied for desorption of hydrogen from the metal hydride. For this reason, metal hydride stores are charged with release of heat and are discharged again when heat is supplied. Depending on the metal hydride, metal hydride stores are discharged at temperatures in the range from −40° C. to 400° C.; however, those having a relatively high storage capacity relative to weight are based on medium-temperature hydrides or high-temperature hydrides.

In the case of medium-temperature hydrides, desorption commences in the range from 100° C. to 200° C. at 1 bar. They have reaction enthalpies in the range from −40 to −65 kJ/mol of $H_2$ and a storage density from about 2.5% by weight to 5% by weight. These include, inter alia, alanates such as $NaAlH_4$, and also amides such as $LiNH_2$ having an $H_2$ uptake capacity up to virtually 4.5% by weight. The optimum hydrogen uptake temperature is about 125° C. and the hydrogen release temperature is from 160 to 185° C. Owing to the relatively high hydrogen storage capacity and relatively low operating temperatures, they are interesting candidates for mobile applications.

In the case of high-temperature hydrides, desorption commences at above 200° C. at 1 bar. They have a reaction enthalpy of more than −65 kJ/mol of $H_2$ and a relatively high storage density of from about 7 to 10% by weight. Often formed from light metals (magnesium, aluminum) and/or nonmetals (nitrogen, boron), they would be well suited to use in fuel cells and $H_2$-powered internal combustion engines owing to the very high capacities, but the high operating temperatures are a hindrance to their use. High-temperature hydrides are therefore at present not used for fuel cells and $H_2$-powered internal combustion engines.

For this reason, an external heating system which heats the metal hydride store for discharge is generally required for use. Part of the energy required for heating the metal hydride store could be taken from the otherwise unutilized waste heat of the fuel cell. However, this energy is generally taken either as electric power from the fuel cell or directly from the hydrogen in the tank by means of a burner, since the waste heat of the fuel cell, e.g. a low-temperature fuel cell, is insufficient to heat a medium- or high-temperature hydride to the necessary temperature. However, if energy is taken as electric power from the fuel cell or from the hydrogen in the tank of a burner, the total efficiency of the system is decreased considerably.

To charge the hydrogen tank, this is externally cooled, as a result of which energy again has to be consumed and this is, for example, given off to the surroundings via an external cooler and the total efficiency of the system is likewise decreased thereby. In actual fact, external cooling of the metal hydride store is one of the main reasons for the present lack of efficiency in comparison to pressure tanks.

DESCRIPTION OF THE INVENTION

It is an object of the invention to provide an efficient system and method for heat management of medium- to high-temperature systems such as a medium- to high-temperature metal hydride store connected to a low-temperature fuel cell, so that the system of metal hydride store and low-temperature fuel cell has an efficiency which is higher compared to known methods and/or has a higher hydrogen storage capacity. In addition, the system should also reversibly allow cooling, e.g. of the metal hydride store during charging.

To achieve the object, the invention proposes a circulation system comprising:
(a) a heat exchange circuit comprising one or more pipes which contain a working medium;
(b) a first heat exchanger 6 which is integrated into the heat exchange circuit and is heat-coupled to a cooling circuit 1 of a fuel cell 4;
(c) a compressor 2 integrated into the heat exchange circuit downstream of the first heat exchanger 6;
(d) a second heat exchanger 3 which is integrated into the heat exchange circuit downstream of the compressor 2 and is heat-coupled to a metal hydride store 7;
(e) an expander 5 integrated into the heat transfer medium circuit downstream of the second heat exchanger 3;
(f) a return conduit from the expander 5 to the first heat exchanger 6.

In one embodiment of the invention, the fuel cell 4 is a low-temperature fuel cell, preferably a low-temperature fuel cell which can be operated at a temperature in the range from 60° C. to 130° C., preferably from 60° C. to 100° C. In a further embodiment, the cooling circuit 1 of the fuel cell 4 comprises a heat exchanger for the cooling liquid, e.g. a radiator, a water cooler, or the like, which is installed downstream of the heat exchange circuit.

In a further embodiment of the invention, the boiling point at atmospheric pressure (1.013 bar) of the working medium is below the minimum operating temperature of the fuel cell, preferably from about 1° C. to 5° C. below this minimum operating temperature.

If, for example, a fuel cell is operated at a temperature of from 70° C. to 85° C. and the heat thereof is removed by means of a cooling circuit in order to be transferred to the working medium, the working medium is advantageously selected so that its boiling point at atmospheric pressure is below the minimum operating temperature of the fuel cell of 70° C. According to this example, a working medium having a boiling point of 69° C. or less, more preferably from 65° C. to 69° C., is preferably selected.

In a further embodiment of the invention, the cooling circuit 1 of the fuel cell 4 comprises a cooling medium having a boiling point, with the boiling point of the working medium in the heat exchange circuit being below the boiling point of the cooling medium in the cooling circuit 1 of the fuel cell 4. The cooling medium is preferably selected from among water and a water/glycol mixture.

In a further embodiment of the invention, the working medium is a liquid having a boiling point at atmospheric pressure (1.013 bar) in the range from 60° C. to 130° C., preferably from 65° C. to 100° C. In a further embodiment of the invention, the working medium is a hydrocarbon having a boiling point at atmospheric pressure (1.013 bar) in the range from 60° C. to 130° C., preferably from 65° C. to 100° C., for example a hydrocarbon selected from the group consisting of hexane such as n-hexane, isohexane or mixtures of different hexane isomers; heptane such as n-heptane, isoheptane or mixtures of different heptane isomers, octane such as n-octane or isooctane or mixtures of different octane isomers; or mixtures of the abovementioned. The working medium is preferably selected from among n-hexane and n-heptane.

In a further embodiment of the invention, the first heat exchanger 6 is a vaporizer, for example a plate heat exchanger vaporizer.

In a further embodiment of the invention, the compressor 2 integrated into the heat exchange circuit is a two-phase compressor. An example of a suitable compressor is a centrifugal pump for conveying liquid/gas mixtures. Such centrifugal pumps are obtainable, for example, under the trade name EDUR® from Eduard Redlien GmbH & Co. KG. Further suitable compressors are, for example, screw compressors or rotary compressors as are described in DE 60 220 888 T2. However, any two-phase compressor is in principle suitable for use in the present invention.

In a further embodiment of the invention, the metal hydride store 7 comprises at least one medium-temperature hydride or at least one high-temperature hydride. In a further preferred embodiment of the invention, the metal hydride store comprises magnesium hydride, aluminum hydride, titanium hydride, manganese hydride, zirconium hydride and/or alloys thereof with other metals, e.g. $LiAlH_4$, $LiBH_4$, $NaAlH_4$, $LiNH_2$, $Mg(NH_2)_2$, $NaBH_4$, $MgH_2$, $AlH_3$, $TiH_2$, $LaNi_5HE$. In one embodiment of the invention, the metal hydride store is selected so that it has a discharge temperature which is above the operating temperature of the low-temperature fuel cell, preferably a discharge temperature in the range from 100° C. to 220° C., preferably from 120° C. to 200° C. The discharge temperature of the metal hydride store is preferably from 30° C. to 120° C. above, preferably from 50° C. to 100° C. above, the operating temperature of the low-temperature fuel cell.

In a further embodiment of the invention, the second heat exchanger 6 is a condenser, for example a plate heat exchanger condenser.

In a further embodiment of the invention, the expander 5 integrated into the heat transfer medium circuit is a two-phase turbine expander as is described, for example, in the U.S. Pat. No. 5,467,613, which is hereby fully incorporated by reference.

A suitable two-phase turbine expander has a construction having a rotor disk with peripheral wings and a nozzle block which accommodates a disk and contains a group of nozzles which are directed onto the wings. The nozzles each have an inlet opening plate in order to assist the dissipation of steam pockets which bead off from the liquid. The nozzles have an internal geometry which runs together to a waist and then runs apart to an outlet. This design achieves supersonic output velocities and produces a flow gradient which aids the removal of liquid droplets. The rotor wings are curved in order to produce a pure impulse design. The rotor is an axial flow construction with a circumferential shell over the wings in order to prevent entrainment of liquid and prevent circulation and renewed intrusion of the liquid.

The invention further provides a method for supplying heat to a metal hydride store connected to a low-temperature fuel cell in a circuit system as described above, wherein:
 (a) a liquid working medium is at least partially vaporized at constant pressure in a first stage by means of a first heat exchanger 6 which is heat-coupled to a cooling circuit 1 of a fuel cell 4;
 (b) the at least partially vaporized working medium is fed into a compressor 2 in which the working medium is compressed in a second stage so that the pressure and the temperature of the working medium are increased after compression;
 (c) the working medium is conveyed through a second heat exchanger 3 which is heat-coupled to the metal hydride store 7, where the working medium at least partially condenses at constant pressure in a third stage with release of heat energy;
 (d) the at least partially condensed working medium is fed to an expander 5 where the working medium is depressurized in a fourth stage so that the pressure and the temperature of the working medium are decreased after depressurization;
 (e) the working medium is recirculated to the first stage.

To charge the metal hydride store, heat is removed from the metal hydride store. For this purpose, the existing system is utilized in such a way that the power of the compressor is throttled back in order to keep the working medium in motion. The working medium at least partially vaporizes as a result of introduction of heat from the metal hydride store, which now becomes the heat source, and condenses on contact with the cooling medium of the fuel cell, the operation of which is at rest. Accordingly, the invention also provides a method for removing heat from a metal hydride store connected to a low-temperature fuel cell in a circulation system as described above, wherein:
 (a) a working medium is at least partially vaporized at constant pressure with introduction of heat from the metal hydride store in a first stage by means of a second heat exchanger 3 which is heat-coupled with the metal hydride store 7;
 (b) the at least partially vaporized working medium is conveyed through an expander 5 in which the at least partially vaporized working medium is optionally depressurized in a second stage so that the pressure and/or the temperature of the working medium is decreased after compression;

(c) the working medium is fed into a first heat exchanger 6 which is heat-coupled with the cooling circuit 1 of a fuel cell 4, in which heat exchanger the working medium is at least partially condensed at constant pressure with release of heat in a third stage;

(d) the at least partially condensed working medium is fed into a compressor 2 which is operated in such a way that the working medium moves in the circulation system;

(e) the working medium is recirculated to the first stage.

DETAILED DESCRIPTION OF THE INVENTION

Figure 2:
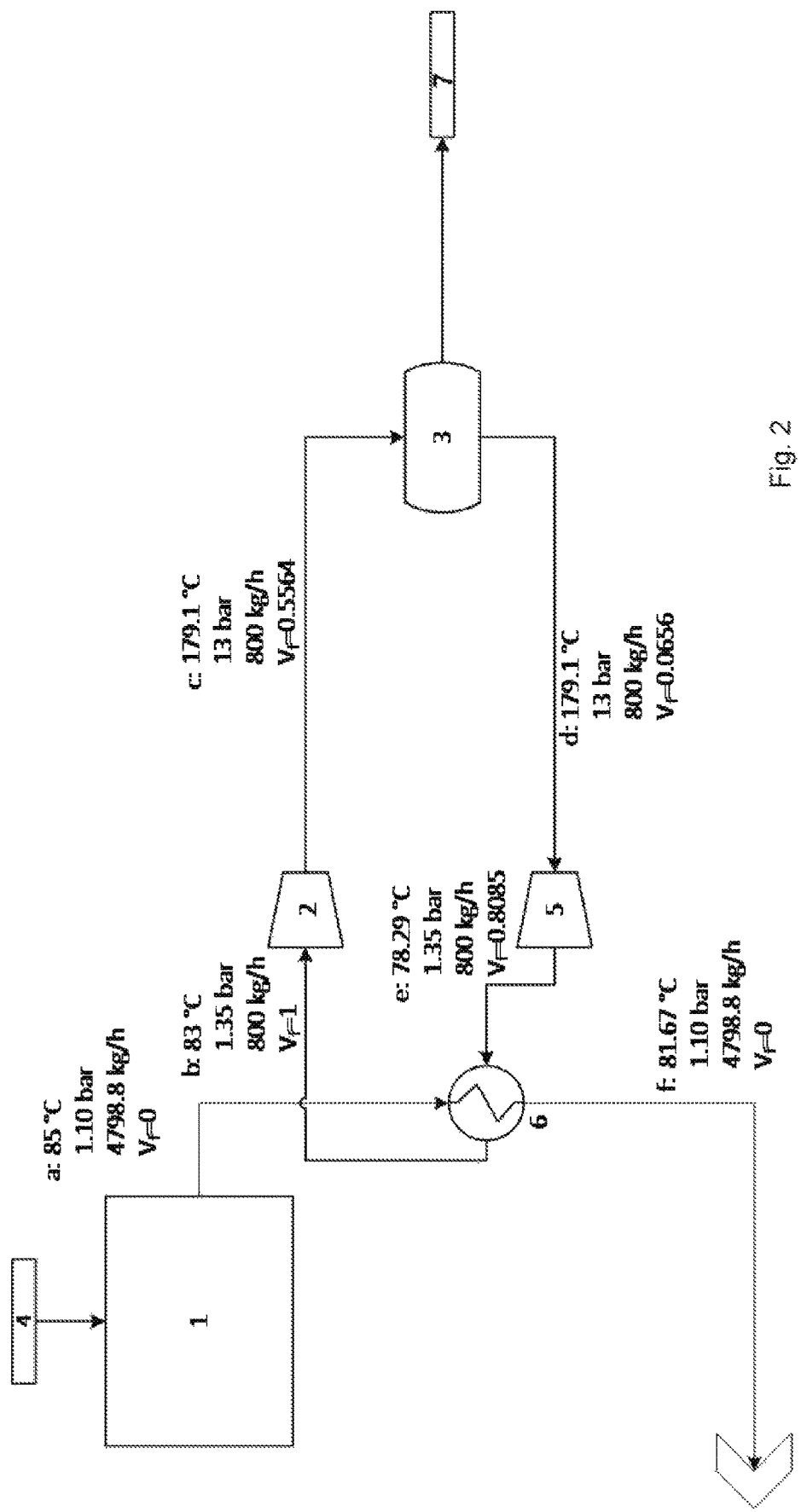
Figure 3:
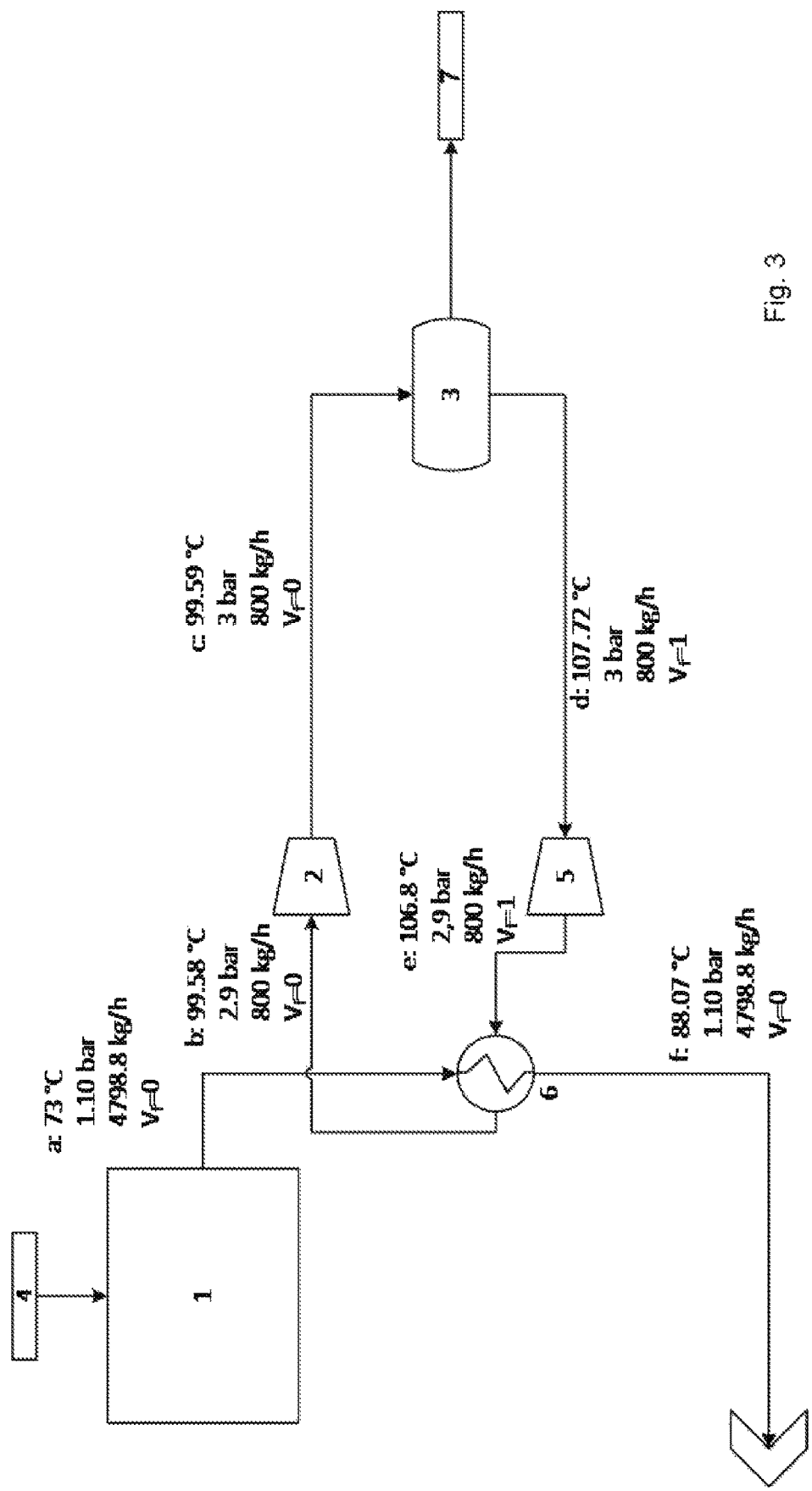

The system of the invention and the methods of the invention will be illustrated by way of example with the aid of the following figures, which are not intended to restrict the invention. The figures show:

FIG. 1 a schematic depiction of the system of the invention;

FIG. 2 a schematic depiction of a method according to the invention for supplying heat to a metal hydride store connected to a low-temperature fuel cell in order to discharge the metal hydride store in a circulation system;

FIG. 3 a schematic depiction of a method according to the invention for removing heat from a metal hydride store connected to a low-temperature fuel cell in order to charge a metal hydride store with hydrogen in a circulation system.

A system according to the invention is schematically illustrated in FIG. 1. During operation, a fuel cell 4 transfers heat energy to a cooling circuit 1 connected thereto. This cooling circuit is connected via a pipe a to a first heat exchanger 6 in which the cooling circuit transfers heat to a working medium, or takes up heat from the working medium when the metal hydride store is being charged. The working medium is conveyed via a pipe b from the first heat exchanger to a compressor 2 which can compress the working medium during operation of the fuel cell or set the working medium into motion during charging of the metal hydride store. The working medium is conveyed via a further pipe c from the compressor 2 to a second heat exchanger 3. There, heat is transferred to the metal hydride store 7 during operation of the fuel cell 4 and discharging of the metal hydride store 7. During charging of the metal hydride store 7, heat is transferred from the metal hydride store 7 to the working medium. A further pipe d leads from the second heat exchanger 3 to an expander 5, for example a turbine, where the working medium can be depressurized. A further pipe e leads from the expander 5 back to the first heat exchanger 6.

FIG. 2 illustrates a method according to the invention for supplying heat to a metal hydride store 7 connected to a low-temperature fuel cell 4 by means of the system according to the invention. The low-temperature fuel cell 4 is operated at from about 70 to 85° C., with the heat arising being removed therefrom by means of a first cooling circuit 1. For example, a water/glycol mixture can be used as working medium in the first cooling circuit. The metal hydride store is discharged at from about 160 to 185° C. n-Hexane, which has a boiling point of 69° C. at atmospheric pressure, is used as working medium in the system according to the invention. The working medium is heated to a temperature of 83° C. under a constant pressure of about 1.35 bar in a first heat exchanger 6, resulting in at least part of the working medium going over from the liquid state into the gaseous state. In a subsequent compressor 2, the predominantly gaseous working medium is compressed so that the pressure of the working medium increases to about 13 bar and the temperature increases to about 179° C. Due to thermodynamic relationships, part of the working medium condenses here. In the second heat exchanger 3 connected to the metal hydride store, which heat exchanger is preferably a jacket around the metal hydride store, a further part of the vapor fraction condenses at unchanged pressure and thus transfers heat via the second heat exchanger 3 to the metal hydride store 7. The condensed working medium having a pressure of about 13 bar and a temperature of about 179° C. is conveyed from the second heat exchanger 3 to a turbine 5 where the working medium is depressurized with release of kinetic energy. During this, the temperature of the working medium drops to about 78° C. and the pressure drops to about 1.35 bar. From the turbine, the working medium is recirculated back into the first heat exchanger 6 where it is once again at least partially vaporized at an unchanged pressure.

FIG. 3 illustrates a method according to the invention for removal of heat from a metal hydride store 7 connected to a low-temperature fuel cell 4 by means of the system according to the invention. The compressor is used only as pump in order to ensure the flow of working medium. The expander 5 also takes up no or only very little power. The working medium conveyed from a first heat exchanger 6 to a compressor 2, here once again n-hexane, is conveyed as liquid phase at a temperature of about 99.6° C. and a pressure of about 3 bar to a second heat exchanger 3 where the system receives heat from a metal hydride store to be charged.

The working medium is heated to a temperature of about 107.7° C., and at least partially vaporizes at a constant pressure of 3 bar. The working medium is fed via an expander 5, for example a turbine, in which the working medium is cooled to about 106.8° C. to a first heat exchanger 6 where it is cooled under unchanged pressure of from about 2.9 bar down to a temperature of about 99.6° C. and thus transfers heat to the cooling circuit of the fuel cell. The heat transferred to the cooling circuit of the fuel cell is removed by means of the downstream heat exchanger (radiator, water cooler or the like).

SYMBOLS IN THE FIGURES

1 Cooling circuit of a fuel cell
2 Compressor
3 Second heat exchanger
4 Low-temperature fuel cell
5 Turbine
6 First heat exchanger
7 Metal hydride store
a Pipe
b Pipe
c Pipe
d Pipe
e Pipe

The invention claimed is:

1. A circulation system which includes a fuel cell with a cooling circuit; a metal hydride store; and a heat exchange circuit, the system comprising:

(a) a heat exchange circuit comprising one or more pipes which contain a working medium;

(b) a first heat exchanger which is integrated into the heat exchange circuit and is heat-coupled to the cooling circuit of the fuel cell;

(c) a compressor integrated into the heat exchange circuit downstream of the first heat exchanger;

(d) a second heat exchanger which is integrated into the heat exchange circuit downstream of the compressor and is heat-coupled to a metal hydride store;

(e) an expander integrated into a heat transfer medium circuit downstream of the second heat exchanger;

(f) a return conduit from the expander to the first heat exchanger.

2. The system as claimed in claim 1, wherein the working medium is a liquid having a boiling point at atmospheric pressure (1.013 bar) in the range from 60° C. to 130° C.

3. The system as claimed in claim 2, wherein the working medium is a liquid having a boiling point at atmospheric pressure (1.013 bar) in the range from 65° C. to 100° C.

4. The system as claimed in claim 3, wherein the working medium is a hydrocarbon.

5. The system as claimed in claim 4, wherein the working medium is n-hexane, n-heptane or mixtures thereof.

6. The system as claimed in claim 2, wherein the working medium is a hydrocarbon.

7. The system as claimed in claim 6, wherein the working medium is n-hexane, n-heptane or a mixture thereof.

8. The system as claimed in claim 1, wherein the fuel cell can be operated at a temperature in the range from 60° C. to 130° C.

9. The system as claimed in claim 8, wherein the fuel cell can be operated at a temperature in the range from 70° C. to 100° C.

10. The system as claimed in claim 1, wherein the first heat exchanger is a vaporizer.

11. The system as claimed in claim 10, wherein the first heat exchanger is a plate heat exchanger vaporizer.

12. The system as claimed in claim 10, wherein the second heat exchanger is a plate heat exchanger condenser.

13. The system as claimed in claim 1, wherein the compressor is a two-phase compressor.

14. The system as claimed in claim 1, wherein the second heat exchanger is a condenser.

15. The system as claimed in claim 1, herein the expander is a two-phase turbine expander.

16. A method for supplying heat to a metal hydride store connected to a fuel cell in a circulation system as claimed in claim 1, wherein:

(a) a liquid working medium is at least partially vaporized at constant pressure in a first stage by means of the first heat exchanger which is heat-coupled to the cooling circuit of the fuel cell;

(b) the at least partially vaporized working medium is fed into the compressor in which the working medium is compressed in a second stage so that the pressure and the temperature of the working medium are increased after compression;

(c) the working medium is conveyed through the second heat exchanger which is heat-coupled to the metal hydride store, where the working medium at least partially condenses at constant pressure in a third stage with release of heat energy;

(d) the at least partially condensed working medium is fed to the expander where the working medium is depressurized in a fourth stage so that the pressure and the temperature of the working medium are decreased after depressurization;

(e) the working medium is recirculated to the first stage.

17. A method for removing heat from a metal hydride store connected to a fuel cell in a circulation system as claimed in claim 1, wherein:

(a) a working medium is at least partially vaporized at constant pressure with introduction of heat from the metal hydride store in a first stage by means of the second heat exchanger which is heat-coupled with the metal hydride store;

(b) the at least partially vaporized working medium is conveyed through the expander in which the at least partially condensed working medium is optionally depressurized in a second stage so that the pressure and/or the temperature of the working medium is decreased;

(c) the working medium is fed into the first heat exchanger (6) which is heat-coupled with the cooling circuit of the fuel cell, in which heat exchanger the working medium is at least partially condensed at constant pressure with release of heat in a third stage;

(d) the at least partially condensed working medium is fed into the compressor which is operated in such a way that the working medium moves in the circulation system;

(e) the working medium is recirculated to the first stage.

18. The system as claimed in claim 1, wherein the cooling circuit of the fuel cell has additional means for removal of heat which are located downstream of the first heat exchanger.

19. The system as claimed in claim 18, wherein the additional means for the removal of heat are selected from among radiators.

* * * * *